United States Patent [19]

Motoori

[11] 4,319,171
[45] Mar. 9, 1982

[54] MOTOR CONTROL DEVICE
[75] Inventor: Ryuzo Motoori, Kawasaki, Japan
[73] Assignee: Nippon Kogaku K.K., Tokyo, Japan
[21] Appl. No.: 167,912
[22] Filed: Jul. 11, 1980
[30] Foreign Application Priority Data Jul. 23, 1979 [JP] Japan ............................ 54-100581[U]

[51] Int. Cl.³ ................................................ H02P 7/14
[52] U.S. Cl. .................................... 318/379; 318/293; 354/25
[58] Field of Search ............... 318/375, 376, 379, 258, 318/261, 273, 280, 293, 294, 466, 468, 380; 354/25, 26, 29, 30, 43, 44; 352/140, 141

[56] References Cited
U.S. PATENT DOCUMENTS

| 3,229,181 | 1/1966 | Evans | 318/293 |
| 3,371,259 | 2/1968 | James et al. | 318/380 |
| 3,427,520 | 2/1969 | Oppedahl | 318/294 X |
| 3,525,883 | 8/1970 | Iordanidis | 318/293 X |
| 3,776,111 | 12/1973 | Maida | 318/280 X |
| 3,809,981 | 5/1974 | Maida | 318/294 |
| 4,079,298 | 3/1978 | Prager | 318/280 X |

Primary Examiner—B. Dobeck
Attorney, Agent, or Firm—Shapiro and Shapiro

[57] ABSTRACT

A motor control device includes a bridge circuit having semiconductor switching elements disposed in each arm thereof and being adapted for the connection of a motor between pairs of arms. The semiconductor switching elements are selectively rendered conductive to alternately drive the motor in forward and reverse directions, and certain ones of a semiconductor switching elements may be simultaneously rendered conductive to form a closed loop which short-circuits the motor and causes dynamic braking. The motor control device is capable of instantaneously stopping the rotation of the motor and is capable of rapidly reversing the motor's direction of rotation. The device is particularly useful in an automatic focusing apparatus or an automatic diaphragm setting apparatus in a camera.

15 Claims, 14 Drawing Figures

MOTOR CONTROL DEVICE

BACKGROUND OF THE INVENTION

1. Field of the Invention

The present invention relates generally to motor control devices for controlling the direction of rotation and the braking of a DC motor, and more particularly to devices useful for controlling a motor employed in an automatic focusing apparatus or an automatic diaphragm setting apparatus in a camera.

2. Description of the Prior Art

In various apparatus employing a DC motor (hereinafter referred to simply as a motor) driven from a DC power source, it is generally required not only to control the rotation of the motor in one direction, but also to stop the motor instantaneously and to reverse its direction of rotation. The ability to instantaneously stop a motor and quickly change its rotational direction, is essential when the motor is employed in a servo system, where rapid and precise control are generally important.

Within limits, a servo system having some of the above-mentioned characteristics may be obtained by increasing the sensitivity or the responsiveness of the servo system. However, increased sensitivity enhances the hunting phenomenon caused by the inertia of the motor and the driven members, and results in reduced stability in operation. Many attempts have been made to lessen the hunting phenomenon. One approach is to increase the reduction ratio of a gear train which is driven by the shaft of the motor. Another known approach is to broaden the dead range of the servo system. However, all the known approaches either unduly limit the sensitivity of the servo system and/or reduce the precision with which the system can be controlled.

Moreover, even for non-servo systems or apparatus which simply use a motor as a driving source, where the inertia of driven members, such as torque transmission members, for example, engaged by the shaft of the motor is large, it is very difficult to stop the rotation of the motor instantaneously or to exercise precise control over its rotation.

Thus, all of the apparatus requiring rapid and precise control of a motor, particularly those apparatus employing a miniature DC motor, such as in a servo mechanism for an automatic diaphragm setting apparatus or an automatic focusing apparatus in a camera, always involve the above-mentioned problems.

SUMMARY OF THE INVENTION

Accordingly, it is an object of the invention to provide a motor control device which can permit the realization of a servo system having high sensitivity, i.e., high response speed, a narrow dead range and high precision.

Another object of the invention is to provide a motor control device which is capable of instantaneously stopping a motor, and which is capable of rapidly reversing the motor's direction of rotation.

Briefly stated, a motor control device in accordance with the invention may comprise a bridge circuit having switching elements disposed in each of the arms of said bridge circuit, the bridge circuit adapted for connection of a motor between pairs of arms, first means for selectively rendering certain ones of the switching elements conductive to alternately drive the motor in forward and reverse directions, and second means for rendering certain ones of the switching elements conductive to form a closed loop which short-circuits the motor and causes dynamic braking of the motor.

Other objects, features, and advantages of the invention will become more fully apparent from the following description and the accompanying drawings.

DETAILED DESCRIPTION OF THE PREFERRED EMBODIMENTS

Figure 1:
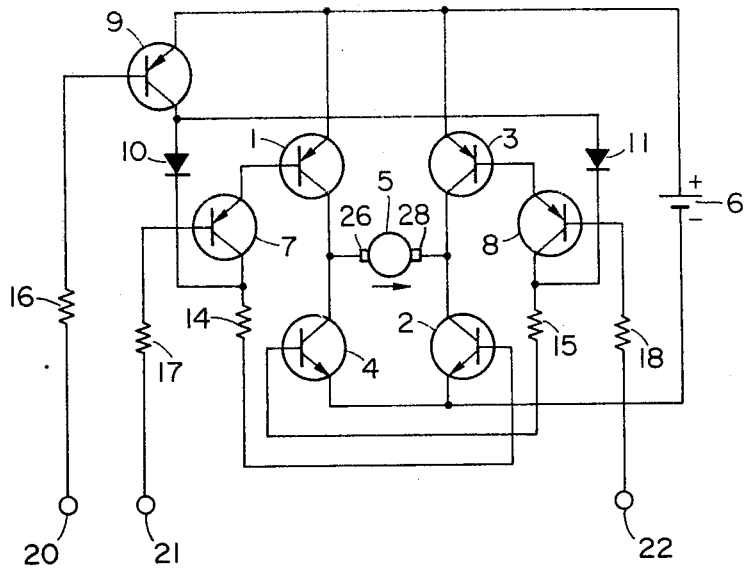
FIG. 1 is a circuit diagram showing a first embodiment of a motor control device in accordance with the invention.

FIG. 1 illustrates a first embodiment of a motor control device in accordance with the invention. As shown, a first pair of series connected semiconductor switching elements 1 and 4 and a second pair of series connected semiconductor switching elements 2 and 3 are connected in parallel to a DC power source 6. Switching elements 1-4, which are preferably transistors, constitute a bridge circuit, one transistor being disposed in each arm of the bridge circuit. A motor 5 is connected between the neutral points of the bridge circuit, being connected to a point between transistors 1 and 4 of the first pair and to a point between transistors 2 and 3 of the second pair.

Transistors 1 and 2 lie in a first pair of opposing diagonal arms of the bridge circuit, and transistors 3 and 4 lie in a second pair of opposing diagonal arms of the bridge circuit. (As used herein, the term "opposing diagonal arms" refers to arms of a bridge circuit which lie parallel to one another on opposite sides of the bridge circuit when the bridge circuit is laid out in a conventional diamond-shaped configuration. As also used herein, two arms of the bridge circuit are "adjacent" when they are connected together at one of their ends to one side of a voltage source applied to the bridge circuit and their opposite ends are connected to different neutral points of the bridge. Accordingly, transistors 1 and 3 are in adjacent arms, and transistors 2 and 4 are in adjacent arms.) As shown in FIG. 1, transistors 1 and 4 and transistors 2 and 3 are preferably of different semiconductor types, transistors 1 and 3 being PNP transistors and transistors 2 and 4 being NPN transistors. Transistors 1 and 4 comprise a first set of complementary connected PNP and NPN transistors, and transistors 2 and 3 comprise a second such set. Accordingly, transistors 1-4 are all operated in a grounded emitter configuration with the motor connected to their collectors as a load.

As will be explained hereinafter, when transistors 1 and 2 are turned on and they conduct, current flows through motor 5 in the direction of the arrow in FIG. 1, causing the motor to turn in a first direction, e.g., the forward direction. Conversely, when transistors 3 and 4 conduct, current flows through motor 5 in the opposite direction to the arrow, causing the motor to turn in the opposite direction, e.g., the reverse direction. Moreover, if the motor is rotating in either direction and the transistors in adjacent arms of the bridge circuit are turned on, e.g., transistors 2 and 4 or transistors 1 and 3, a closed loop will be formed, short-circuiting the motor. The back electromotive force (emf) generated by the motor due to its rotation will be absorbed in the closed loop and cause dynamic braking of the motor, instantaneously stopping its rotation. Accordingly, by selectively controlling transistors 1–4, the direction of rotation of the motor can be controlled and its rotation can be halted as desired.

To control transistors 1–4, transistor drivers 7, 8, and 9 may be employed, as illustrated in FIG. 1. Transistor 7 has its emitter connected to the base (control terminal) of transistor 1 and its collector connected to the base of transistor 2 through a resistor 14. Similarly, the emitter of transistor 8 is connected to the base of transistor 3 and its collector is connected to the base of transistor 4 through a resistor 15. The base of transistor 7 may be connected through a resistor 17 to a terminal 21, and the base of transistor 8 may be connected through a resistor 18 to a second terminal 22. Transistor 9, which is used for dynamic braking, has its emitter connected to the positive terminal of power source 6 and its collector connected through diodes 10 and 11 and resistors 14 and 15 to the bases of transistors 2 and 4, respectively. The base of transistor 9 may be connected through a resistor 16 to a third terminal 20.

When terminals 20, 21 and 22 are all open (or have a "high" signal level applied to them corresponding to the positive potential of power source 6) all of the transistors in FIG. 1 are off (non-conducting). If a "low" signal (corresponding to the negative potential of power source 6) is applied to terminal 21, transistors 1 and 7 both will be rendered conductive. The collector current of transistor 7 will flow through resistor 14 into the base of transistor 2, rendering transistor 2 conductive also. This allows the current to flow through motor 5 in the direction of the arrow in FIG. 1 so that the motor will be driven into forward rotation. Similarly, if a low signal is applied to terminal 22, transistors 3 and 8 will become conductive and, in turn, transistor 4 will be rendered conductive. Accordingly, the current in motor 5 will flow in the opposite direction to the arrow in FIG. 1 so that the motor will be driven in the reverse direction.

To brake the motor, both terminals 21 and 22 are first opened (or supplied with a high signal) so that transistors 7 and 8 are both turned off. Thereafter, when a low signal is applied to terminal 20, transistor 9 will be turned on, and its collector current will flow into the bases of transistors 2 and 4 through diodes 10 and 11 and resistors 14 and 15. Accordingly, transistors 2 and 4 will be simultaneously turned on forming a closed loop which short-circuits the motor and absorbs the back electromotive force (emf), causing the motor to be instantaneously stopped. Upon closing of the loop, one of transistors 2 or 4 will be operated in a reverse direction, depending upon the polarity of the back emf. For example, if the back emf generated by the motor is positive at terminal 26 of the motor and negative at terminal 28, transistor 4 will have a collector current flow in the forward direction, i.e., from its collector to its emitter. However, in transistor 2, which is a NPN type, the current will flow in the reverse direction, i.e., from its emitter to its collector. In this manner, the back electromotive force will be absorbed, causing dynamic (or rheostatic) braking of the motor. When the polarity of the back emf is reversed with respect to the above example, NPN transistor 4 will have a current flow in the reverse direction.

As is apparent from the foregoing, the control signals applied to control terminals 20, 21 and 22 should be independent, and their timing should be controlled so that a control signal is applied to only one terminal at a time. If control signals are applied to two or more terminals at the same time, power source 6 will be short circuited.

Figure 2:
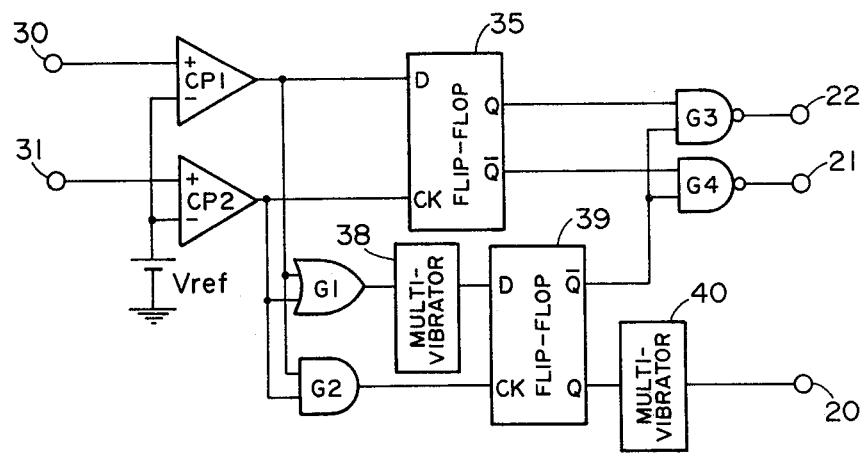
FIG. 2 is a schematic diagram of a control circuit useful for controlling the motor control device of FIG. 1.

FIG. 2 illustrates a control circuit useful for generating control signals having the proper timing for controlling the device of FIG. 1. The control circuit of FIG. 2 is particularly adaptable for use in an automatic focusing apparatus in a camera, in which an objective lens or the like is moved along the optical axis for focusing by an amount corresponding to a measured distance value between the camera and the object to be photographed. Motor 5 may be used to drive the objective lens.

As shown in FIG. 2, the control circuit has input terminals 30 and 31, which are adapted to receive sinusoidal signals from a well-known type of focus detecting mechanism (not illustrated). The relative phase shift between the signal applied to input terminal 30 and the signal applied to input terminal 31 is proportional to the difference between the image plane formed by the objective lens for a particular focus position of the lens and the film plane of the camera. For example, when the phase of the signal applied to input terminal 30 is advanced with respect to the phase of the signal on input terminal 31, the camera is out-of-focus in a first direction, e.g., focused in front of the subject, whereas when the phase shift is reversed, the camera is out-of-focus in the opposite direction, e.g., focused to the rear of the subject. When the phases of the two signals coincide or approximately coincide, the camera is in-focus. From the signals on input terminals 30 and 31, the control circuit of FIG. 2 generates the appropriate control signals on terminals 20–22, which are connected to correspondingly numbered terminals in the circuit of FIG. 1, to drive the lens to an in-focus condition, as will now be described.

The input sinusoidal signals on terminals 30 and 31 are introduced into comparators CP1 and CP2, which compare the input signals to a reference voltage ($V_{ref}$) and shape them into rectangular signals having the same relative phase shift. The output signals from comparators CP1 and CP2 are applied to the D input and the clock (CK) input, respectively, of a D flip-flop 35, which latches to the value of the D input when the input of CK goes high. The output of flip-flop 35 is indicative of the phase advance or delay between the input signals. The output signal from each comparator is also input into both an OR gate G1 and an AND gate G2. The outputs of OR gate G1 and AND gate G2 correspond to the amount of phase shift between the output signals from the comparators. The output of OR gate G1 is applied to a one shot multivibrator 38 which outputs a pulse having a predetermined time duration each time the output of G1 goes high, being triggered on the leading edge of the pulse output from G1. The output pulse from multivibrator 38 is introduced into the D input of a second D flip-flop 39, and the output of AND gate G2 is introduced into the clock (CK) input of flip-flop 39. When the output of G2 goes high, flip-flop 39 latches to the value of the output signal from multivibrator 38. The Q and $\overline{Q}$ outputs of flip-flop 35 are introduced into NAND gates G3 and G4, respectively, along with the $\overline{Q}$ output of flip-flop 39. The outputs from gates G3 and G4 constitute the control signals on terminals 22 and 21, respectively, for driving the motor in the reverse and the forward directions, respectively. The braking control signal on terminal 20 is derived from a second one shot multivibrator 40 connected to the Q output of flip-flop 39.

As previously mentioned, based upon the relative phase between the input signals on terminals 30 and 31, the control circuit of FIG. 2 generates the appropriate control signals on terminals 21 and 22 to drive the motor in either the forward direction or the reverse direction, depending upon the out-of-focus condition of the camera. When an in-focus condition is obtained, the output of multivibrator 40 goes low to cause braking of the motor.

Figure 3:
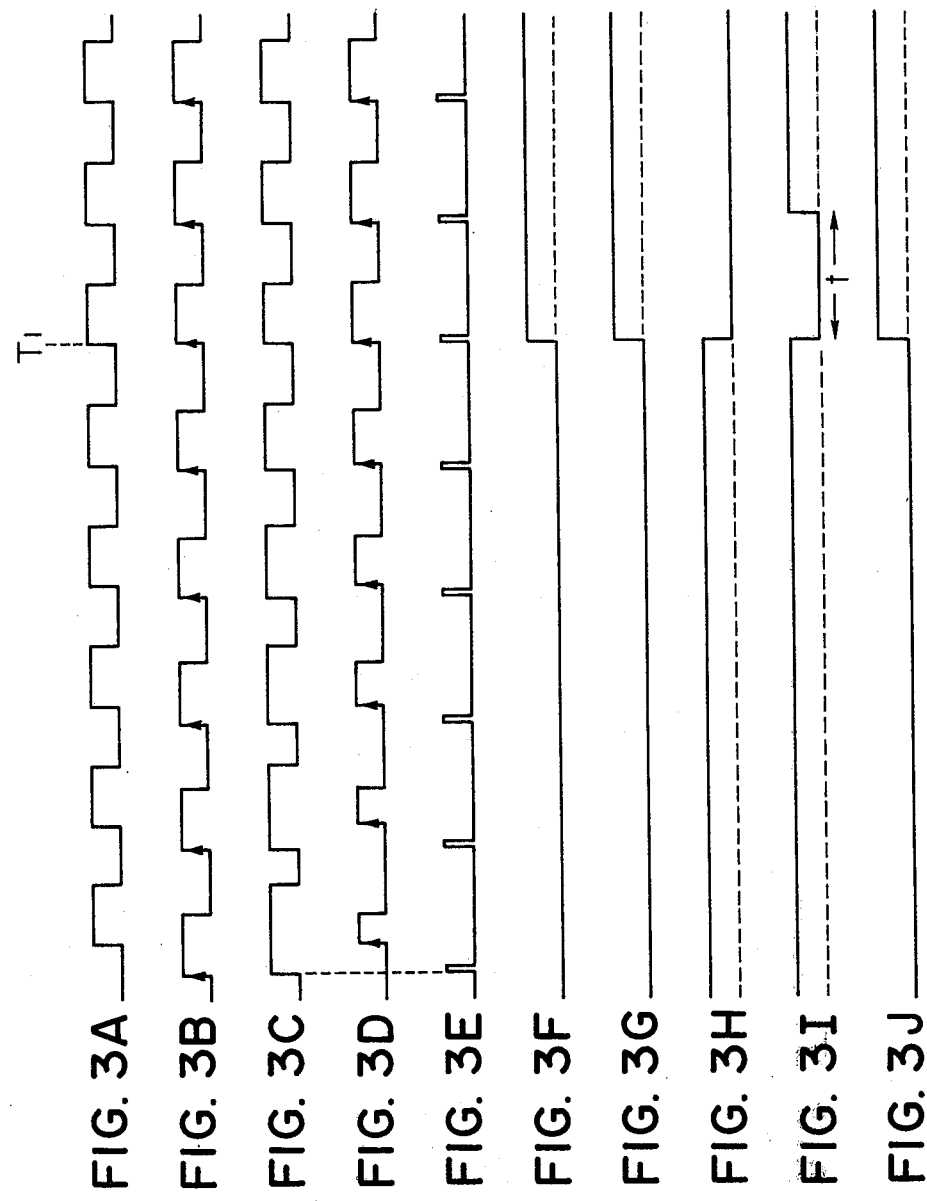
FIGS. 3A-3J are timing diagrams showing the relative phases of various signals in the circuit of FIG. 2.

The operation of the control circuit of FIG. 2 may be best understood by reference to the timing diagram of FIG. 3. The outputs of comparators CP1 and CP2 are represented by FIGS. 3A and 3B, respectively. Assuming that prior to time T1 the camera is out-of-focus toward the rear, and that at time T1 the camera is in-focus, FIGS. 3A and 3B show that the output signal of CP1 is phase delayed relative to the output signal of CP2 prior to time T1. At time T1 when in an in-focus condition is obtained, the output signals of CP1 and CP2 are in phase. FIGS. 3C and 3D represent the outputs of gates G1 and G2, respectively. FIG. 3E represents the output of multivibrator 38. As shown, each time the output of gate G1 goes high, multivibrator 38 issues an output pulse having a predetermined time duration which is small with respect to the output signals of CP1 and CP2.

Prior to time T1, the Q output of flip-flop 39 is low, as shown in FIG. 3F, and its $\overline{Q}$ output is high. On the other hand, prior to time T1, the Q output of flip-flop 35 is low and its $\overline{Q}$ output is high, as shown in FIGS. 3G and 3H, respectively. Since NAND gate G3 receives a high input from flip-flop 39 and a low input from flip-flop 35, its output is high. However, the signals applied to the two inputs of NAND gate G4 are both high, so that the output of G4 is low, as shown in FIG. 3J. Therefore, transistor 8 in FIG. 1 is turned off and transistor 7 is conductive, resulting in a current flow through the motor in the direction indicated by the arrow of FIG. 1. This moves the objective lens toward the in-focus position.

At time T1 when an in-focus condition is obtained, the output of multivibrator 40 goes low for a predetermined time duration t (FIG. 3I). At the same time, the outputs from gates G3 and G4 both go high. Therefore, transistors 7 and 8 are both turned off, and transistor 9 is turned on for a time equal to t. This renders transistors 2 and 4 conductive and, as previously described, instantaneously stops motor 5 by dynamically braking the motor. Time t may be selected to have a duration which is sufficient to insure that motor 5 is completely stopped.

Figure 4:
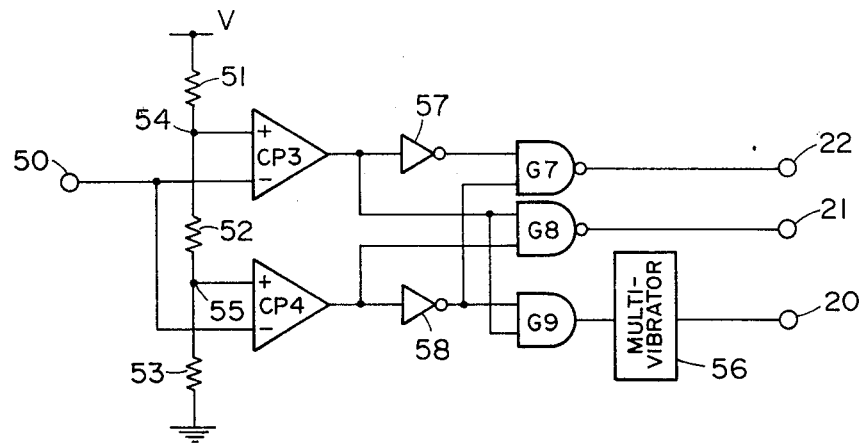
FIG. 4 is a schematic diagram of another control circuit useful for controlling the motor control device of FIG. 1.

FIG. 4 illustrates another embodiment of a control circuit which, similar to the control circuit of FIG. 2, outputs control signals on terminals 20-22 to control driver transistors 7-9 of FIG. 1. The control circuit of FIG. 4 is designed to accept on input terminal 50 a voltage level from the output of a servo error amplifier or the like, and is particularly adaptable for an automatic diaphragm setting apparatus, another type of automatic focusing apparatus whose output is a voltage level corresponding to the focus condition of a camera, and other motor driven systems.

In FIG. 4, a reference voltage V is divided by three resistors 51, 52, and 53 to form two reference voltages on terminals 54 and 55 which are applied to the non-inverting inputs of comparators CP3 and CP4, respectively. The resistors are preferably selected so that the difference between the two reference voltages is relatively small. The input voltage on terminal 50 is applied to the inverting input of the comparators as a common signal voltage. The outputs of comparators CP3 and CP4 are introduced through inverting amplifiers 57 and 58, respectively, into a NAND gate G7. The output of G7 is the control voltage on terminal 22 for driving the motor in the reverse direction. The outputs of the comparators are also introduced into a second NAND gate G8, the output of which is the control voltage on terminal 21 for driving the motor in a forward direction. The output of comparator CP3 and the output of comparator CP4 inverted by amplifier 58 are also introduced into AND gate G9, the output of which is used to trigger a one shot multivibrator 56. The output of multivibrator 56 is the braking control signal on terminal 20.

When the input signal voltage on terminal 50 is coincident with the medial value between the two reference voltages on terminals 54 and 55, the output from comparator CP3 is high and the output from comparator CP4 is low. Accordingly, the output signals from gates G7, G8, and G9 are all high, and multivibrator 56 outputs a low signal on terminal 20 for a predetermined time duration. This turns both transistors 7 and 8 (FIG. 1) off and turns transistor 9 on for the duration of the output signal from multivibrator 56, causing dynamic braking of the motor.

When the signal voltage on terminal 50 is higher than the reference voltage on terminal 54, the outputs of comparators CP3 and CP4 are both low, and, therefore, the outputs of gates G7 and G9 are low, whereas the output of gate G8 is high. This turns transistor 7 off and renders transistor 8 conductive so that the motor is driven in a reverse direction. Conversely, if the signal voltage on terminal 50 is lower than the reference voltage on terminal 55, the outputs from CP3 and CP4 are both high. Accordingly, the output of gate G7 is high and the outputs of gates G8 and G9 are low, rendering transistor 7 conductive and turning off transistor 8, so that the motor is driven in a forward direction.

Figure 5:
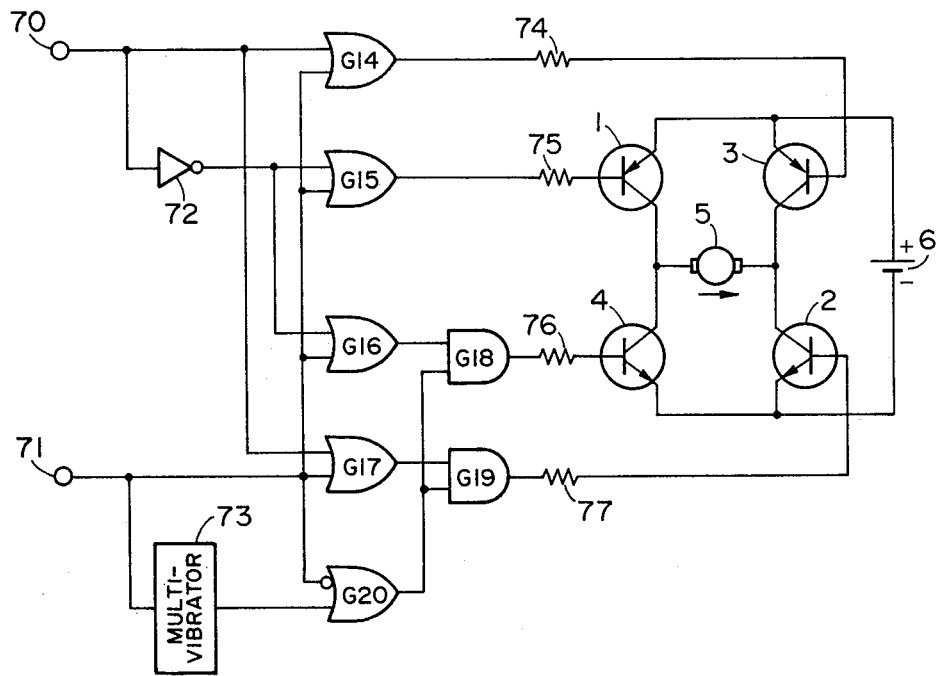
FIG. 5 is a circuit diagram showing a second embodiment of a motor control device in accordance with the invention.

FIG. 5 illustrates another embodiment of a motor control circuit in which transistors 1-4 may be driven directly by a digital logic control circuit, and driver transistors 7-9 (and their associated circuitry) are eliminated. In FIG. 5, motor 5 and transistors 1-4, which form the bridge circuit, may be the same as those in the first embodiment illustrated in FIG. 1. The circuit of FIG. 5 has only two signal input terminals 70 and 71. Input terminal 70 is used to control the direction of rotation of the motor depending upon whether the input signal on terminal 70 is high or low. Input terminal 71 is used for dynamically braking the motor whenever its input signal is high. The circuit of FIG. 5 is formed to operate in a so-called stop priority mode. Thus, dynamic braking is always effected on the motor when the input signal on terminal 71 is high, irrespective of the level of the signal then being applied to input terminal 70.

As shown, an input signal on terminal 70 is applied directly to OR gates G14 and G17, and is applied through an inverter amplifier 72 to OR gates G15 and G16. The outputs of gates G14 and G15 are connected through resistors 74 and 75, respectively, directly to transistors 3 and 1, respectively. The outputs of gates G16 and G17 are introduced into AND gates G18 and G19, respectively, through resistors 76 and 77. The input signal on terminal 71 is applied as a second input to gates G14–G17, and to the inverting input of an inverting OR gate G20, the output of which is connected to gates G18 and G19. The input signal on terminal 71 is also applied to a one shot multivibrator 73, which outputs a pulse having a predetermined time duration to gate G20.

The circuit of FIG. 5 operates in the following manner. Assuming that the input signal on terminal 71 is low, i.e., braking is not desired, when a high level signal is applied to input terminal 70, the outputs of OR gates G14 and G17 will go high, and the outputs of OR gates G15 and G16 will be low. Since the low level signal on input terminal 71 is applied directly to one input of gate G20, the output from gate G20 will go high, causing AND gate G19 to go high. This renders transistors 1 and 2 conductive so that current will flow through motor 5 in the direction indicated by the arrow in FIG. 5 (forward direction). Conversely, if a low level signal is applied to input terminal 70, the outputs of gates G14 and G17 will be low and the outputs of gates G15 and G16 will go high. Accordingly, transistors 3 and 4 will be rendered conductive so that the current in motor 5 will flow in the opposite direction to the arrow in FIG. 5, causing the motor to rotate in the reverse direction.

Irrespective of the level of the signal on terminal 70, when a high level signal is applied to terminal 71, the outputs of gates G14–G17 will all go high. When the high level signal is applied to terminal 71, multivibrator 73 will output a high level signal having a predetermined time duration. As a result, the output of gate G20 will go high for a time equal to the time duration of the output from multivibrator 73. This will open gates G18 and G19, rendering transistors 2 and 4 conductive and causing dynamic braking of the motor. Since the outputs from gates G14 and G15 are high, transistors 1 and 3 will be cut off. When the output of multivibrator 73 goes low, (after the predetermined time duration) the output of gate G20 will also go low, closing gates G18 and G19 and turning transistors 2 and 4 off.

The arrangement of the circuit of FIG. 5 permits the application of a stop signal to brake the motor as desired, irrespective of the presence of a signal on terminal 70 for driving the motor in a particular direction. Therefore, the arrangement permits the realization of a rather simplified circuit for controlling the direction of rotation of the motor. The input signals on terminals 70 and 71 of the circuit of FIG. 5 may be derived from control circuits such as illustrated in FIGS. 2 and 4, for example.

In the illustrated embodiments, the transistors 1–4 which constitute the bridge circuit have been disclosed as a combination of PNP and NPN transistors. However, the bridge circuit may also be formed using only NPN transistors or PNP transistors. Also, to handle motors having large wattage ratings, the transistors constituting the arms of the bridge circuit may comprise parallel or Darlington connected transistors. Although in the illustrated embodiments, transistors 2 and 4 have been utilized to form the closed loop which short-circuits the motor for dynamic braking, it should be understood that transistors 1 and 3 also may be used for this purpose instead of transistors 2 and 4. From the foregoing, it is apparent that a motor control device in accordance with the invention provides a relatively simple and effective means for controlling a motor. The motor can be instantaneously stopped and its direction of rotation reversed, permitting the realization of a servo system having high sensitivity, high response and high precision.

While preferred embodiments of the invention have been shown and described, it will be apparent to those skilled in the art that changes can be made in these embodiments without departing from the principles and spirit of the invention, the scope of which is defined in the appended claims.

What is claimed is:

1. A motor control device comprising: first and second pairs of transistors, each transistor being connected to a voltage source, the first pair of transistors being adapted for connection to terminals of the motor and operative when both transistors of the first pair are conducting to connect the motor to the voltage source such that the motor is driven in a forward direction, the second pair of transistors being adapted for connection to the terminals of the motor and operative when both transistors of the second pair are conducting to reversibly connect the motor to the voltage source such that the motor is driven in a reverse direction;

first selective means for rendering the first pair or the second pair of transistors conductive alternately to drive the motor in the forward direction or the reverse direction; and second selective means for rendering one transistor of the first pair and one transistor of the second pair conductive to form a closed loop which short-circuits the motor and causes dynamic braking of the motor.

2. A device according to claim 1, wherein said transistors each have an emitter and a collector, and each pair of said transistors comprises complementary connected PNP and NPN transistors, all of said transistors being operated in a grounded emitter configuration and being adapted to have their collectors connected to the motor.

3. A device according to claim 2, wherein the current flow through the transistors of each pair is in a forward direction when the motor is driven in the forward and in the reverse directions, whereas the current flow through one of the transistors forming the closed loop which short-circuits the motor is in the reverse direction during dynamic braking.

4. A device according to claim 1, wherein said first selective means comprises a first semiconductor driver for simultaneously rendering conductive the transistors of the first pair when a first control signal is applied to a control terminal of the first driver to render the first driver conductive, and a second semiconductor driver for simultaneously rendering conductive the transistors of the second pair when a second control signal is applied to a control terminal of the second driver to render the second driver conductive, and wherein the second selective means comprises a third semiconductor driver for rendering conductive said one transistor of the first pair and said one transistor of the second pair to form said closed loop and short-circuit the motor, when a third control signal is applied to a control terminal of the third driver.

5. A device according to claim 4 further comprising a control circuit for generating said control signals, the control circuit having first, second, and third terminals connected to the control terminals of the first, second, and third drivers, respectively.

6. A device according to claim 5, wherein the control circuit is a digital logic circuit having means for preventing the generation of more than one of said control signals at a time.

7. A device according to claim 6, wherein the preventing means includes gate means for ensuring the control signals on the first and second terminals are of opposite polarities, except when the motor is stopped or is being dynamically braked.

8. A device according to claim 6, wherein the control circuit includes a timer circuit for generating the third control signal on the third terminal have a predetermined time duration.

9. A device according to claim 1, wherein the first selective means and the second selective means comprise a digital logic control circuit having a plurality of output terminals, each output terminal being connected to a control terminal of a corresponding one of said transistors, the control circuit having means for generating control signals on said output terminals for selectively rendering the transistors conductive.

10. A device according to claim 9 wherein the control circuit includes a timer circuit for generating a control signal having a predetermined time duration, such control signal being employed for controlling the transistors of each pair which form the closed loop for short-circuiting the motor, thereby causing dynamic braking of the motor for said predetermined time duration.

11. A device according to claim 5 or 9, wherein the control circuit receives input signals representative of the condition of a mechanism being driven by the motor, and the control circuit generates said control signals in response to said input signals.

12. A motor control device comprising:
a bridge circuit comprising first, second, third and fourth arms, each arm including a transistor having a collector and an emitter, the first and third arms being connected together and to one terminal of a voltage source and forming a first pair of adjacent arms, the second and fourth arms being connected together and to an opposite polarity terminal of the voltage source and forming another pair of adjacent arms, the first and fourth arms being connected together and to a first terminal of the motor and the second and third arms being connected together and to another terminal of the motor, the first and second arms and the third and fourth arms respectively constituting first and second pairs of opposing diagonal arms, the transistors in the first pair of adjacent arms being PNP type transistors, and the transistors in said other pair of adjacent arms being NPN type transistors, each transistor being operated in a grounded emitter configuration;

first means for rendering conductive the transistors in the first pair of opposing diagonal arms of the bridge circuit to cause the motor to be driven in a forward direction and for alternately rendering conductive the transistors in the second pair of opposing diagonal arms of the bridge circuit to cause the motor to be driven in a reverse direction, and second means for rendering conductive the transistors in one pair of said adjacent arms to form a closed loop which short-circuits the motor and causes dynamic braking of the motor.

13. A device according to claim 12, wherein said first means comprises a first semiconductor driver for rendering conductive the transistors in the first pair of opposing diagonal arms to drive the motor in the forward direction upon a first control signal being applied to a control terminal of the first driver to render the first driver conductive, and a second semiconductor driver for rendering conductive the transistors in the second pair of opposing diagonal arms to drive the motor in the reverse direction upon a second control signal being applied to a control terminal of the second driver to render the second driver conductive, and wherein said second means comprises a third semiconductor driver for rendering conductive the transistors in one of the pairs of adjacent arms to form said closed loop and short-circuit the motor upon a third control signal being applied to a control terminal of the third driver.

14. A device according to claim 13 further comprising a control circuit having first, second, and third output terminals respectively connected to the control terminals of the first, second, and third drivers, the control circuit being responsive to an input signal thereto and having means for generating said control signals such that only one of said first, second and third control signals is generated at a time.

15. A device according to claim 14, wherein the control circuit includes a timer circuit for generating said third control signal on the third output terminal to have a predetermined time duration that is sufficient to ensure that the motor is completely stopped.

* * * * *